June 18, 1935.  F. W. JACKMAN  2,004,987
COMPOSITE MOTION PICTURES
Filed Jan. 8, 1934
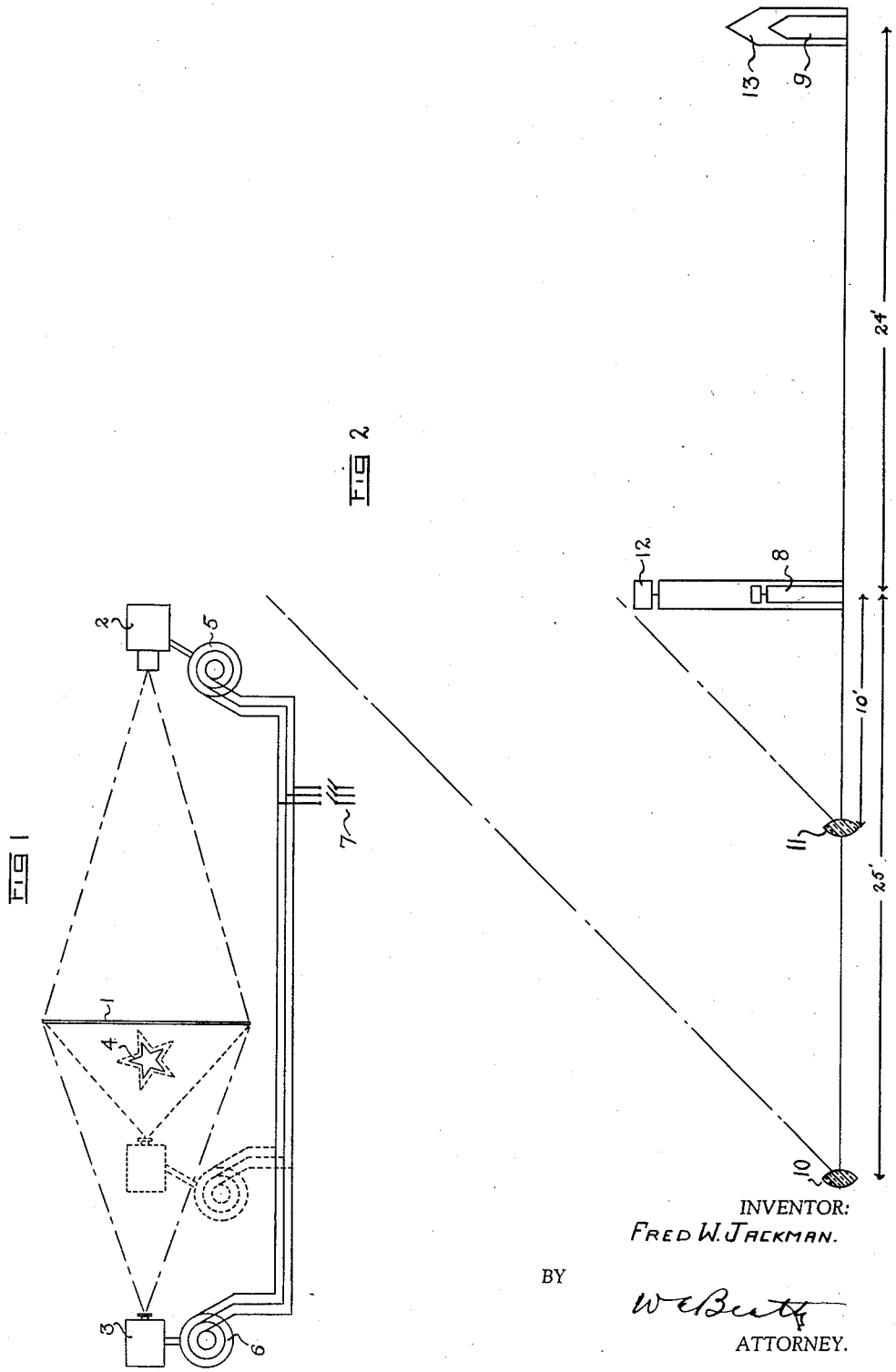
INVENTOR:
FRED W. JACKMAN.
BY
W E Butt
ATTORNEY.

Patented June 18, 1935

2,004,987

UNITED STATES PATENT OFFICE 2,004,987

COMPOSITE MOTION PICTURES

Fred W. Jackman, Beverly Hills, Calif., assignor to Warner Bros. Pictures, Inc., New York, N. Y., a corporation of Delaware Application January 3, 1934, Serial No. 705,655

2 Claims. (Cl. 88—16)

The invention relates to composite motion pictures wherein a background scene is projected onto a translucent screen, in front of which a foreground scene or action is arranged, the camera and projector operating in synchronism.

In my application, Serial No. 539,818, filed May 25, 1931, for Composite motion pictures, I have described and claimed an arrangement for making "closeups" and "long shots" with the translucent screen type of process shot. As disclosed and claimed in my prior application, in making "closeups" and "long shots", the field of view of the camera and of the projector should be changed by corresponding amounts to take into account the fact that the background scene represents an object or objects substantially removed from the locus of the translucent screen.

An object of the present invention is to set forth more precisely the factors which need to be taken into account in making "closeups" and "long shots" with the translucent screen type of process shot.

It will be understood that in changing from a "closeup" to a "long shot", either the camera as a whole may be bodily moved to its different positions of distance from the screen, or the camera may remain in fixed position and the lenses thereof changed to accomplish the same purpose, namely, to change the field of view of the camera. While it is possible to move the projector, to change the field of view thereof, preferably this is accomplished in all cases by changing the lenses therein, as the projector is usually mounted in a fire-proof booth and is very difficult to move in comparison to the camera.

For further details of the invention, reference may be made to the drawing, wherein:

Fig. 1 is a schematic view of a translucent screen arrangement for making "closeups" and "long shots".

Fig. 2 is a diagram illustrating the apparent magnification of foreground and background objects with the camera lens at different distances therefrom.

Referring in detail to the drawing, a background scene is projected onto a translucent screen 1 by a motion picture projector 2. The projector 2 is driven in a suitable manner in synchronism with the motion picture camera 3 which is arranged to photograph action represented by the inner star 4 in front of the screen 1. As an example of a synchronous coupling between the projector 2 and camera 3, I have illustrated a three-phase motor 5 which drives the projector 2 and a similar three-phase motor 6 which drives the camera 3, these motors being supplied from a common power line 7. The motors 5 and 6 may be single phase synchronous motors or they may be three-phase motors as shown with the addition of an electrical interlock as now in common use in sound recording.

The foreground action 4 may be illuminated by a lamp or lamps so placed that the light therefrom does not fall on the front of the screen 1, as will be readily understood.

Referring to Fig. 2, I have illustrated the use of a camera for photographing, from different distances, a foreground object 8 in front of a background object 9. The "long shot" and "closeup" positions of the camera are represented by the two lens positions 10 and 11 respectively. In the assumed case, the foreground object 8 is 24 feet in front of the background object 9. Also, the camera is 25 feet in front of the foreground object 8, in the "long shot" position and 10 feet in front of the foreground object 8 for the "closeup" position. The camera therefore takes a long shot where it is 25 feet from the foreground object and 49 feet from the background object; also, a "closeup" where it is 10 feet from the foreground object and 34 feet from the background object.

For the "long shot", the foreground and background objects appear on the negative in the relative heights indicated for the objects 8 and 9 respectively. For the "closeup" the relative heights of the two objects are now increased as represented at 12 and 13 respectively.

The apparent magnification on moving from a "long shot" to a "closeup" of the object in the foreground, is in proportion to the relative distances of the camera which is 2.5 to 1.

The relative magnification of the object in the background is computed in the same way and equals 1.43 to 1.

The above illustrates that if a translucent screen were employed in the plane of or adjacent the foreground object, moving a camera from a "long shot" to a "closeup" would increase the apparent magnification of the projected picture by 2.5 to 1, whereas in reality the background object should only have been increased in the ratio of 1.43 to 1. Under the conditions just stated therefore, the magnification of the picture projected on the translucent screen, according to my invention, is reduced by an amount depending on the apparent distance of the nearest important object in the background scene in order to off-set the otherwise undue magnification of the projected picture due to moving from a "long shot" to a "closeup", and in order that the objects in the projected picture will harmonize in size with the foreground object for both camera positions.

The same results can be accomplished by taking photographs at different distances from a background, corresponding to "long shot" and "closeup" positions, if the prearranged locations of the camera shown in Figs. 1 and 2 are known. These different background photographs are employed when the camera in Fig. 1 is moved into correspondingly different positions, whereby the magnification of the projected background scene is changed to compensate for the change of magnification of the action, with the benefits described in connection with Fig. 2.

Having thus described the invention what is claimed as new and desired to secure by Letters Patent is,

I claim:

1. The method of producing composite pictures which comprises projecting onto a translucent screen a background scene representing a real background scene outside of the locus of said screen, photographing action before said screen, changing the magnification of the image of said action in said camera, changing the magnification of the projected background scene a different amount to compensate for said change of magnification of the image of said action in said camera, said different amount of change of magnification being of such an extent that the background on the camera film is of the same size as if the real background had been photographed directly, and photographing the action with the magnification of said action and of said projected background scene thus changed.

2. The method of producing composite pictures which comprises projecting onto a translucent screen a background scene representing a real background scene outside of the locus of said screen, photographing action before said screen, changing the magnification of the image of said action in said camera, changing the magnification of the projected background scene by a lesser amount to compensate for the fact that the background scene projected on said screen represents a real background scene outside of the locus of said screen, said lesser amount of change of magnification being of such an extent that the background on the camera film is of the same size as if the real background had been photographed directly, and photographing the action with the magnification of said projected background scene thus changed, whereby "closeups" and "long shots" of the action are obtained before substantially the same background that would be photographed if said camera had photographed said action before the real background scene instead of photographing a projected picture of the background scene at the locus of said screen.

FRED W. JACKMAN.